US 008914550B2

(12) United States Patent
Jokinen et al.

(10) Patent No.: US 8,914,550 B2
(45) Date of Patent: Dec. 16, 2014

(54) SYSTEM AND METHOD FOR TRANSFERRING DATA BETWEEN COMPONENTS OF A DATA PROCESSOR

(71) Applicants: Tommi M. Jokinen, Austin, TX (US); David B. Kramer, Cedar Park, TX (US); Kum Xu, Austin, TX (US)

(72) Inventors: Tommi M. Jokinen, Austin, TX (US); David B. Kramer, Cedar Park, TX (US); Kum Xu, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 0 days.

(21) Appl. No.: 13/841,916

(22) Filed: Mar. 15, 2013

(65) Prior Publication Data

US 2014/0281043 A1 Sep. 18, 2014

(51) Int. Cl.
*G06F 3/00* (2006.01)
*G06F 13/00* (2006.01)
*G06F 5/00* (2006.01)
*G06F 13/12* (2006.01)

(52) U.S. Cl.
CPC .................................. *G06F 13/126* (2013.01)
USPC ................. 710/6; 710/5; 710/32; 710/38

(58) Field of Classification Search
CPC .. H04L 49/70; H04L 63/0428; H04L 63/0485
See application file for complete search history.

(56) References Cited

U.S. PATENT DOCUMENTS

| 5,784,649 | A | 7/1998 | Begur et al. |
| 6,338,108 | B1 * | 1/2002 | Motomura ..................... 710/110 |
| 8,286,188 | B1 * | 10/2012 | Brief .............................. 719/312 |
| 2001/0018719 | A1 | 8/2001 | Francis |
| 2009/0271535 | A1 * | 10/2009 | Yamaguchi et al. ............ 710/18 |
| 2012/0117331 | A1 * | 5/2012 | Krause .......................... 711/141 |

* cited by examiner

*Primary Examiner* — Idriss N Alrobaye
*Assistant Examiner* — Ronald Modo

(57) ABSTRACT

A data processing device includes a plurality of devices, a processor core, a memory, and a queue manager. The processor core stores one or more commands in a command queue of the memory to be executed by the plurality of devices to implement a data transfer path. The queue manager stores a frame queue for each of the plurality of devices. Each frame queue includes a first field having a pointer to an address of the command queue, and a second field to identify a next-in-sequence frame queue. A first device stores a data descriptor in the frame queue of the second device to initiate a data transfer from the first device to the second device. The data descriptor includes a field to indicate an offset value from the address of the command queue to a location of a command to be executed by the second device.

20 Claims, 10 Drawing Sheets

SYSTEM AND METHOD FOR TRANSFERRING DATA BETWEEN COMPONENTS OF A DATA PROCESSOR

FIELD OF THE DISCLOSURE

This disclosure generally relates to data processing, and more particularly to a system and method for transferring data.

BACKGROUND

An integrated circuit can include multiple data processor devices. A particular data processor device can include hardware components that can each perform different operations on data within the data processor device. Such hardware components can include one or more general-purpose instruction based data processor cores, e.g., as with a multi-core processor, and one or more application specific components. For example, a particular data processor can use a specific hardware component to implement a security check, encryption/decryption, or the like, for handling the ingress of Ethernet traffic before routing the received data to an egress port of the data processor device.

Each hardware component of the integrated circuit can have different commands that need to be executed when handling network traffic. Thus, a processor within the data processor device that controls data flow through the data processor device may have to issue/assign separate commands in a particular order for each hardware component, in order to effectuate a sequence of data handling operations by the plurality of hardware components. As the number of components that perform operations on the data increases, the amount of overhead needed by a processor to coordinate handling of the data also increases, limiting a number of operations that can be executed in the data processor.

BRIEF DESCRIPTION OF THE DRAWINGS

The present disclosure may be better understood, and its numerous features and advantages made apparent to those skilled in the art by referencing the accompanying drawings.

DETAILED DESCRIPTION

Figure 1:
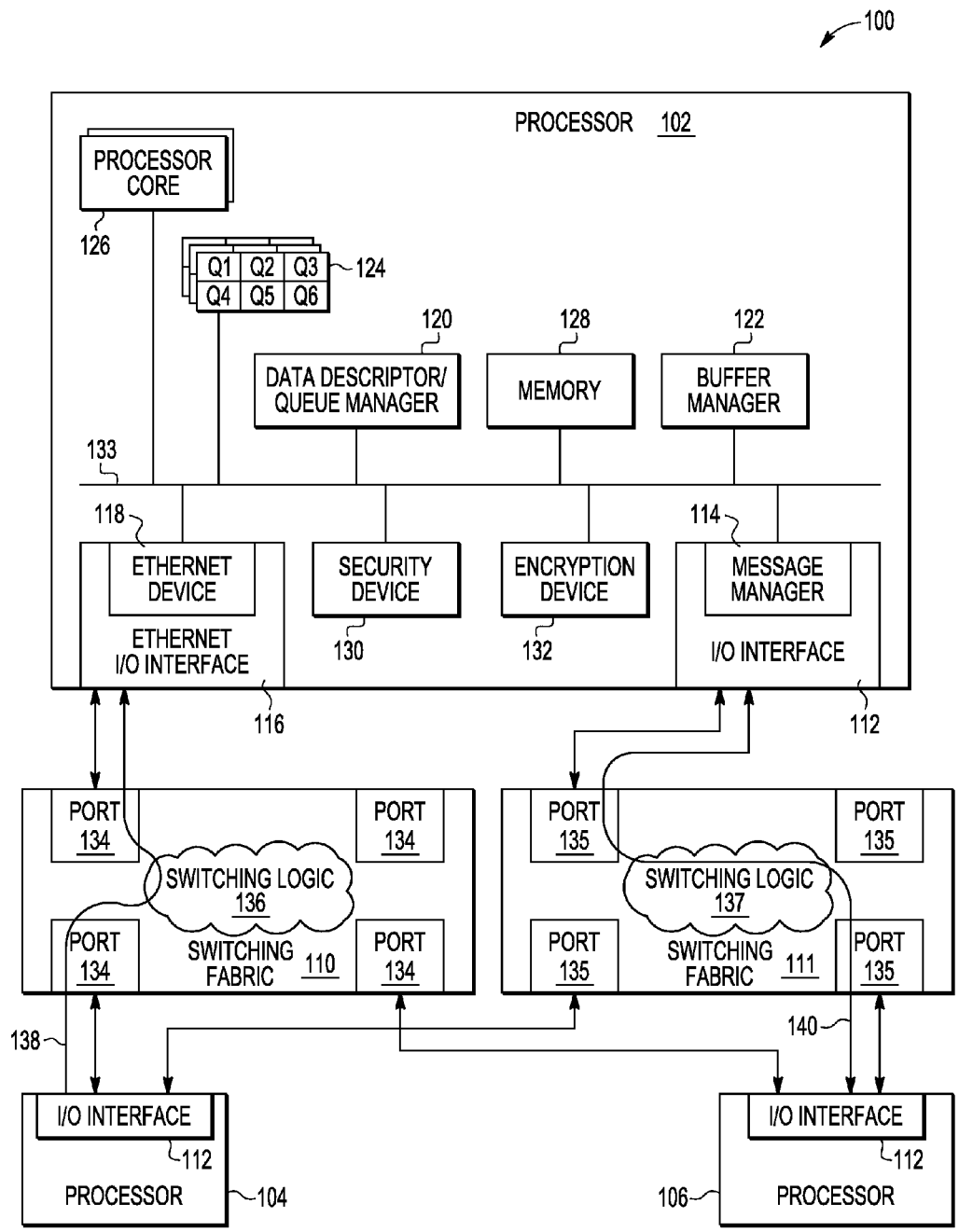
FIG. 1 illustrates a system including multiple processors in accordance with at least one embodiment of the present disclosure.

According to a particular embodiment, a data processor device employing centralized data queuing that is shared amongst various components of the processor can initiate transfers of the data between the hardware components that are "autonomous," in that they do not require further intervention from a control processor once the transfers are initiated. By relieving a control processor the transfers of overhead operations during data transfers, the bandwidth of the processor increases.

The transfer of information along a sequence of hardware components of the data processor can require that the information be processed by each of the hardware components. For example, before information can be provided to an Ethernet I/O device for transmission from the data processor it may be necessary that one or more other operations be performed based upon the information. Examples of various operations that may need to be performed before information can be provided to a transmitting device can include formatting, compressing, encrypting, the like, and combinations thereof. Each of these operations can be implemented by different hardware components that communicate with each other to form a data path from the ingress device to the egress device. The various hardware components of a data path can communicate with each other using centralized data queuing. Using centralized queuing, an ingress device saves data in a memory location that is accessible by various other hardware components. In particular, the data is saved to a memory location that is accessible by a next in-sequence hardware component of the data path.

A data processor device can provide configuration information that defines the components of a particular data path from an ingress device to an egress device, and the manner in which each component of the data path is to operate as information transfers along the data path. Configuration information includes data flow information and command information. The data flow information includes the specific sequence of hardware components that make up a particular data path. The command information includes a set of commands stored in a location of memory, e.g., a command queue, that is accessible by each of the hardware components of a data path that needs to execute specific commands to perform an operation. Thus, the set of commands can include commands for each of the various hardware components of the data path, as needed to implement a particular data path.

A set of queues are defined for each data path. The set of queues includes a different queue corresponding to each of the components that are downstream from the ingress device. Each of these queues, referred to as frame queues, includes a first attribute that identifies the location of the command queue where instructions are stored, a second attribute that identifies a frame queue location of the next in sequence hardware component of the data path, and a storage location where data descriptors to be processed by the device corresponding to the frame queue are queued. For example, a storage location associated with each frame queue can store a pointer to the top of the command queue, while another storage location stores a pointer to the frame queue of the next in sequence hardware component.

An ingress device can initiate a data transfer along specific data path, by writing a data descriptor to the first-in-sequence frame queue associated with a device of the data path. The first-in-sequence device will then execute a particular number of commands from the command queue, and write a data descriptor to the second-in-sequence frame queue when processing is complete. The data descriptor written to the second-in-sequence frame queue includes an offset value, referred to herein as a hop, that identifies a first command stored in the command queue to be executed by the next-in-sequence hardware component. In this manner, once a data path is configured, the information being transferred is autonomously handled, (e.g., without intervention by a processor core).

In a particular embodiment, the ingress device can be an Ethernet I/O interface that is receiving unencrypted information that needs to be encrypted before being sent to another data processor device via a different I/O port, e.g., a RAPIDIO egress port, as discussed in greater detail below. The data processor can set up, prior to any data being received, a set of frame queues that define a data path that includes an encryption device, or any other data paths and associated command information that may be needed to transfer different types of data. The data processor also creates a set of commands to be executed by the devices along the data path. The location of the first-in-sequence hardware component of the data path (e.g., the encryption device), is provided to the ingress device. When data is first received at the ingress device, the ingress device can identify the data to determine a particular data path for the data. For example, an Ethernet I/O interface (i.e., the ingress device) can retrieve information from the header of the data to identify that the data is associated with a preconfigured data path. In another embodiment, when data is first received at the Ethernet I/O interface, the Ethernet I/O interface can notify a data processor that creates the set of commands based on the received data packet.

The ingress device stores a data descriptor in the frame queue of the first-in-sequence hardware component (e.g. the encryption device). In an embodiment, the frame queue includes the location of the command queue and the location of the frame queue of the next-in-sequence hardware component (e.g., the egress device). In response, the encryption device executes a number of commands from the command queue location to implement a desired function. In an embodiment, the encryption device can execute a plurality of commands from the command queue until a stop indicator is encountered. The encryption device can track an amount/length of the commands it executed. When command processing is complete, the encryption device writes a data descriptor to the frame queue of the I/O port that includes an offset value that reflects the amount/length of command/control information consumed by the encryption device (e.g., sixteen bytes). In response, the egress device of the I/O port begins to execute a number of commands in the command queue after the amount consumed by the encryption device, such as sending the data out of the I/O port. The egress device can locate the commands in the command queue by the pointer to the command queue in the frame queue associated with the I/O port and the offset for the command stored in the data descriptor. Various embodiments of the present disclosure will be better understood with reference to FIGS. 1-10.

FIG. 1 illustrates an example system 100, including processors 102, 104, and 106 (processors 102-106) and switching fabrics 110 and 111. In an embodiment, the system 100 is a system on a chip (SoC), such that each of the processor 102-106 is included within the same SoC. In another embodiment, system 100 can be an integrated circuit die, a packaged device that can include one or more integrated circuit die, a printed circuit board that can include one or more packaged devices and integrated circuit die, the like, and combinations thereof. In an embodiment, the switching fabrics 110 and 111 can be crossbar switches or the like.

Each of the processors 102-106 includes an input/output (I/O) interface 112. Processor 102 includes a message manager 114 within the I/O interface 112, an Ethernet I/O interface 116, and an Ethernet device 118 within the Ethernet I/O interface 116. The processor 102 also includes a data descriptor/queue manager 120 (referred to below as a queue manager 120), a buffer manager 122, multiple groups of queues 124, multiple processor cores 126, a memory 128, a security device 130, and an encryption device 132. The processor 102 also includes an interconnect 133 to enable the devices of the processor 102 to communicate with one another.

Depending on the application, queues in the groups of queues 124 can be physical queues, virtual queues, and the like. Each of the other processors 104 and 106 can also include one or more of the components illustrated for processor 102, but these have not been shown in FIG. 1 for simplicity. The switching fabric 110 includes multiple ports 134 and switching logic 136. The switching fabric 111 includes multiple ports 135 and switching logic 137. Each of the processors 102-106 is connected to a corresponding port 134 of switching fabric 110 and a corresponding port 135 of switching fabric 111, and can operate as a destination processor or a source processor for receiving and sending messages, respectively. In an embodiment, the switching fabrics 110 and 111 can be a single switching fabric with a single switching logic. In one embodiment, the packets can be transferred between the processors by the switching logic 136 or switching logic 137, which can be cross-point switches implemented in hardware, software, or the like.

A data stream 138 illustrates an example of communication of data between processor 104 and processor 102 via a communication path through the switching fabric 110. Based upon header information in packets of the data stream 138, the switching logic 136 determines that the packets are addressed to the processor 102, and routes the packets out of the switching fabric 110 via a port 134 coupled to the processor 102.

A communication path can include: an intra-die communication path, wherein packets are transmitted between processors of a common integrated circuit die; or, an inter-die communication path, wherein packets are transmitted between processors on different die. For example, the processors 102, 104, and 106 can reside on separate die that are mounted to a common substrate, such as to a printed circuit board, to a package substrate, and the like.

In some applications, data streams can be compliant with a RAPIDIO communication protocol. The RAPIDIO communication protocol is a protocol for communicating between chips on a circuit board, between different circuit boards using a backplane, and the like. Thus, the system 100 can utilize the RAPIDIO communication protocol to transfer packets between different processors of the system 100, such as instruction based data processors. In one embodiment, the packets can be part of a RAPIDIO Type11 message, a RAPIDIO Type9 data stream, or the like. RAPIDIO type11 is a data message communication, and the message can transfer up to four kilobytes of data segmented over up to sixteen packets, each of which requires a logical layer response. RAPIDIO type9 is a particular format for streaming data. This data streaming format allows a processor to transfer up to sixty-four kilobytes of data that is segmented into many packets. Also, type9 data streaming requires the processors 102-106 to have hardware resources in place to handle every segmented message.

In an example RAPIDIO data stream, each of the processors 102-106 can receive data via Ethernet traffic, perform different operations on the data, and then provide the data via a RAPIDIO communication. For simplicity, these operations will be discussed only with respect to processor 102. The processor cores 126 can define different data transfer paths amongst devices within the processor 102 and different lists of commands for the devices based on different types data that can be received at the processor 102. In an embodiment, processor cores 126 can preconfigure the different data transfer paths and different lists of commands prior to any data being received at the processor 102. For example, the processor core 126 can set up a data transfer path that includes: security device 130, then encryption device 132, and then message manager 114. The processor cores 126 can store the preconfigured list of commands for the devices along the data transfer path in a command queue located in the memory 128.

The processor cores 126 can set up the data transfer path by determining an order of devices within the processor 102 for the data to be transferred between. The processor cores 126 can then create a number of frame queues, corresponding to the devices along the data path, within the queue manager 120. Each of these frame queues includes a first attribute providing the location of the command queue where instructions are stored, a second attribute identifying a frame queue location of the next in sequence hardware component of the data path, and a storage location where data descriptors to be processed by the device corresponding to the frame queue are queued. For example, a storage location associated with each frame queue can store a pointer to the top/starting address of the command queue, while another storage location indicates a frame queue of the next in sequence hardware component.

The Ethernet device 118 can receive data (e.g., via the data stream 138), can identify the type of data, and can then store the data in one of the shared queues 124 such that each of the message manager 114, the security device 130, and the encryption device 132 can access the data to perform an operation on the data. The Ethernet device 118 can also store a data descriptor in the first-in-sequence frame queue that the security device 130 monitors. The data descriptor can trigger the security device 130 to retrieve the data and perform a predefined operation on the data based on specific commands in the command queue. The security device 130 can then store a data descriptor in a next-in-sequence frame queue that the encryption device 132 monitors. This data descriptor can trigger the encryption device 132 to retrieve the data descriptor and perform a predefined operation from the command queue. The encryption device 132 can then store the data descriptor in a frame queue that the message manager 114 monitors. This data descriptor can trigger the message manager 114 to retrieve the data and perform a predefined operation. For example, the message manager 114 can provide the data to the processor 106 via data stream 140 through ports 135 and switching logic 137 of switching fabric 111.

In this manner, the processor core 126 defines the operations and the frame queues for the data prior to operations being executed. Then the message manager 114, the security device 130, and the encryption device 132 can autonomously transfer the data between the devices without the processor core 126 intervening after each device performs an operation. The implementation of the data transfer between the hardware components associated operations will be discussed in greater detail with respect to FIGS. 2-10 below.

FIGS. 2-10 illustrate hardware components, frame queues, and data descriptors within the processor 102 of FIG. 1 in more detail in accordance with at least one embodiment of the present disclosure. The processor 102 includes the message manager 114, the Ethernet device 118, the queue manager 120, the queues 124, the memory 128, the security device 130, the encryption device 132, which are all in communication via the interconnect 133.

Figure 2:
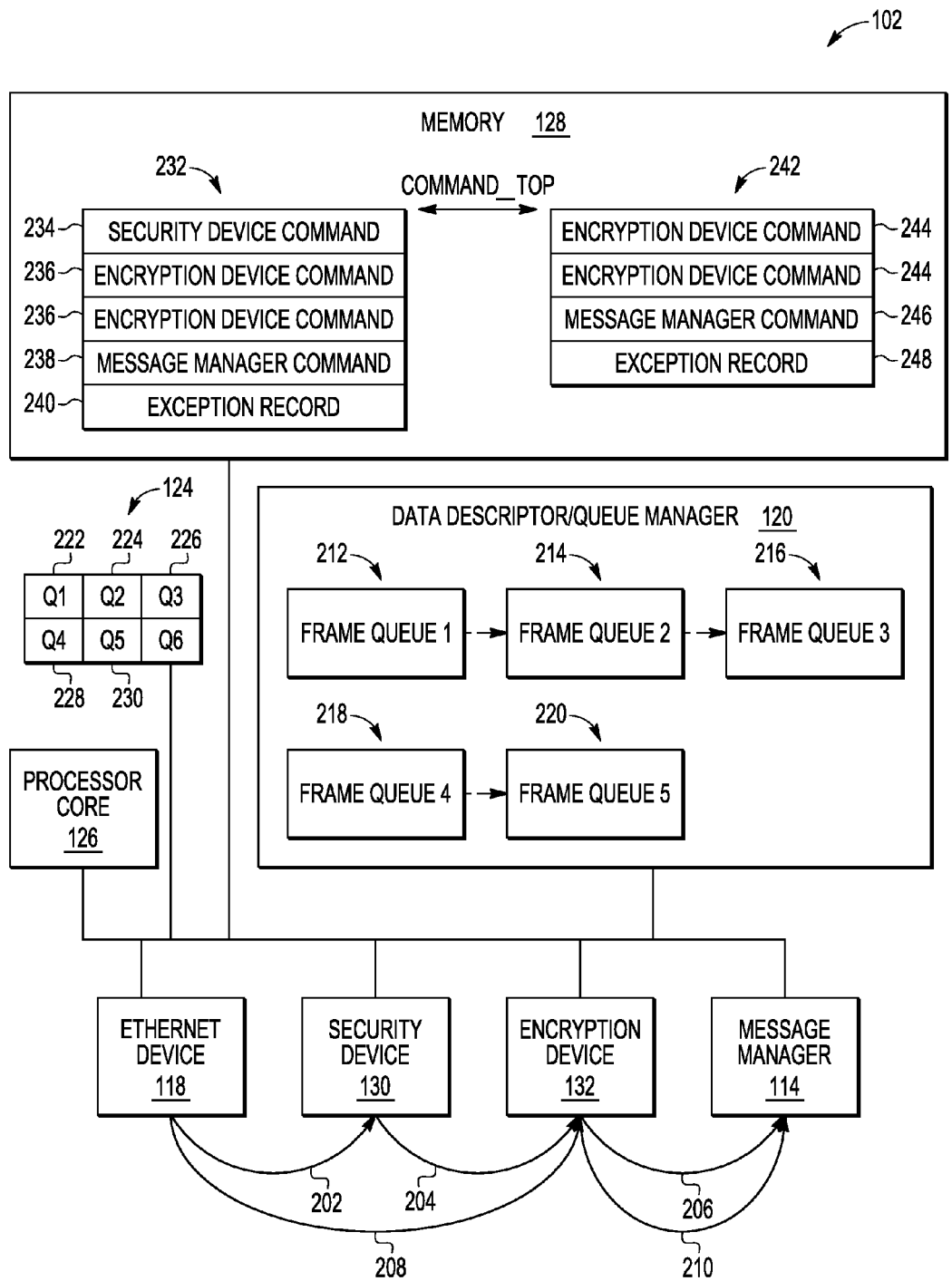
FIGS. 2 and 3 illustrate hardware components within a processor of FIG. 1 in more detail in accordance with at least one embodiment of the present disclosure.

Referring now to FIG. 2, the processor core 126 can define different data transfer paths amongst the security device 130, the encryption device 132, and the message manager 114 based on a type of data received. For example, a first data transfer path can include paths 202, 204, and 206, and a second data transfer path can include paths 208 and 210. The processor core 126 also sets multiple frame queues associated with each of the devices along the data transfer path. In one example, the processor core 126 can create and link frame queues 212, 214, and 216 to create the first data transfer path.

For example, the frame queue 212 can be associated with the security device 130 and can point to the frame queue 214 as the next-in-sequence frame queue in the data transfer path. The frame queue 214 can be associated with the encryption device 132 and can point to the frame queue 216 as the next-in-sequence frame queue in the data transfer path. The frame queue 216 can be associated with the message manager 114.

In another example, the processor core 126 can create and link frame queues 218 and 220 to create the second data transfer path. For example, the frame queue 218 can be associated with the encryption device 132 and can point to the frame queue 220 as the next-in-sequence frame queue in the data transfer path. The frame queue 220 can be associated with the message manager 114.

The processor core 126 can also set the commands for each of the devices along the data transfer path, and can store the commands in a command queue, such as command queues 232 and 242. The command queues 232 and 234 can be stored in the memory 128. Commands for the first data path, such as a security device command 234, encryption device commands 236, and a message manager command 238, can be stored in the command queue 232. The command queue 232 can also include an exception record 240. Similarly, the commands for the second data path, such as encryption device commands 244 and a message manager command 246, can be stored in the command queue 242. The command queue 242 can also include an exception record 248.

In an embodiment, each of the commands in a command queue can be different sizes. For example, in command queue 232, the security device command 234 can be sixteen bytes long, the encryption device command 236 can be thirty-two bytes long, and the message manager command 238 can be sixteen bytes long. The exception record 240 can be a portion of the command queue 232 that can be used to store a command to be executed if an error is detected by one of the Ethernet device 118, the security device 130, the encryption device 132, and the message manager 114.

Similarly, each of the commands in the command queue 242 can be different sizes. For example, in command queue 232 the encryption device command 244 can be thirty-two bytes long, and the message manager command 246 can be sixteen bytes long. The exception record 248 can be a portion of the memory 128 that can be used to store errors in the data detected by one of the Ethernet device 118, the security device 130, the encryption device 132, and the message manager 114.

If data is to be transferred via a first data transfer path, as determined by, for example, a type of data received after the processor core 126 sets up the frame queues 212, 214, and 216, the data can be transferred through the processor 102 via the data transfers 202, 204, and 206. The data transfer path 202 involves the Ethernet device 118 performing an operation on the data and then passing the data to the security device 130. In an embodiment, the Ethernet device 118 can transfer the data to the security device 130 by storing a data descriptor in the frame queue 212, associated with the security device 130. The frame queue 212 can be associated with the security device 130 by the security device 130 monitoring the frame queue 212 and detecting when a data descriptor is stored in the frame queue 212.

The data transfer path 204 involves the security device 130 transferring the data to the encryption device 132 by the security device 130 storing a data descriptor in frame queue 214 associated with the encryption device 132. Similarly, the data transfer path 206 involves the encryption device 132 transferring the data to the message manager 114 by the encryption device 132 storing a data descriptor in the frame queue 216 associated with the message manager 114.

If a type of data received at the Ethernet device 118 causes the Ethernet device 118 to initiate the second transfer path instead of the first transfer path, the data can be transferred through the processor 102 via the data transfers 208 and 210. In this situation, data transfer path 208 involves the Ethernet device 118 performing an operation on the data and then passing the data to the encryption device 132. In an embodiment, the Ethernet device 118 can transfer the data to the encryption device 132 by storing a data descriptor in the frame queue 218 associated with the encryption device 132. The transfer path 210 involves the encryption device 132 transferring the data to the message manager 114 by storing a data descriptor in the frame queue 220.

During the data transfers of the first data path the Ethernet device 118, the security device 130, and the encryption device 132 can store the data in different queues 222, 224, and 226 of the group of queues 124. During the data transfers of the second data path the Ethernet device 118 and the encryption device 132 can store the data in different queues 228 and 230 of the group of queues 124.

Figure 3:
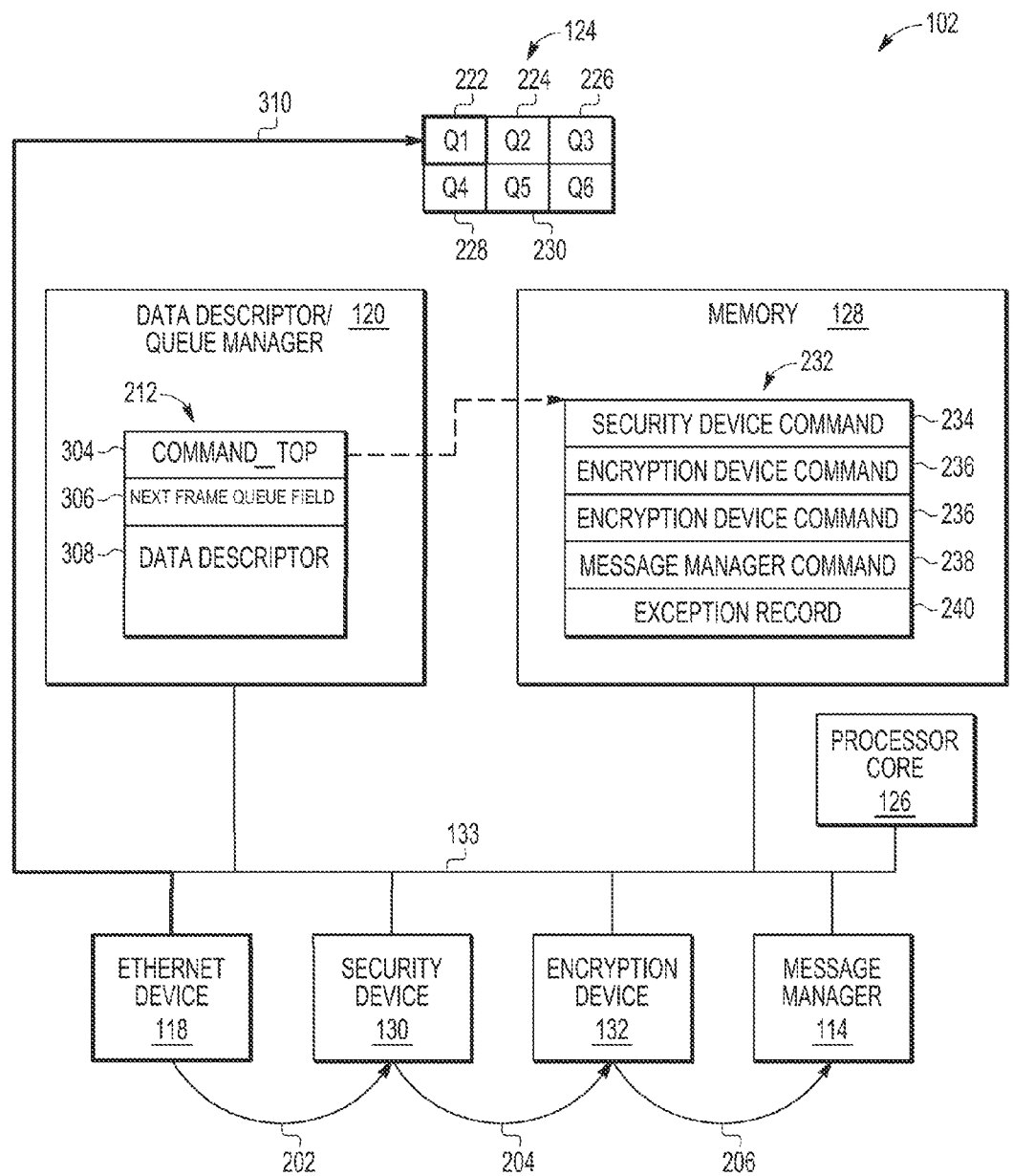

Referring now to FIG. 3 the processor core 126 can set up a number of frame queues, such as frame queues 212, 214, and 216 of FIG. 2, to be utilized along a data transfer path. The processor core 126 can also store a list of commands within a command queue 232. Each frame queue can include a command top field 304, a next frame queue field (e.g., next frame queue field 306), and a storage for a number of data descriptors 308. Details of frame queue 212 will be discussed with respect to FIG. 4 below.

Figure 4:
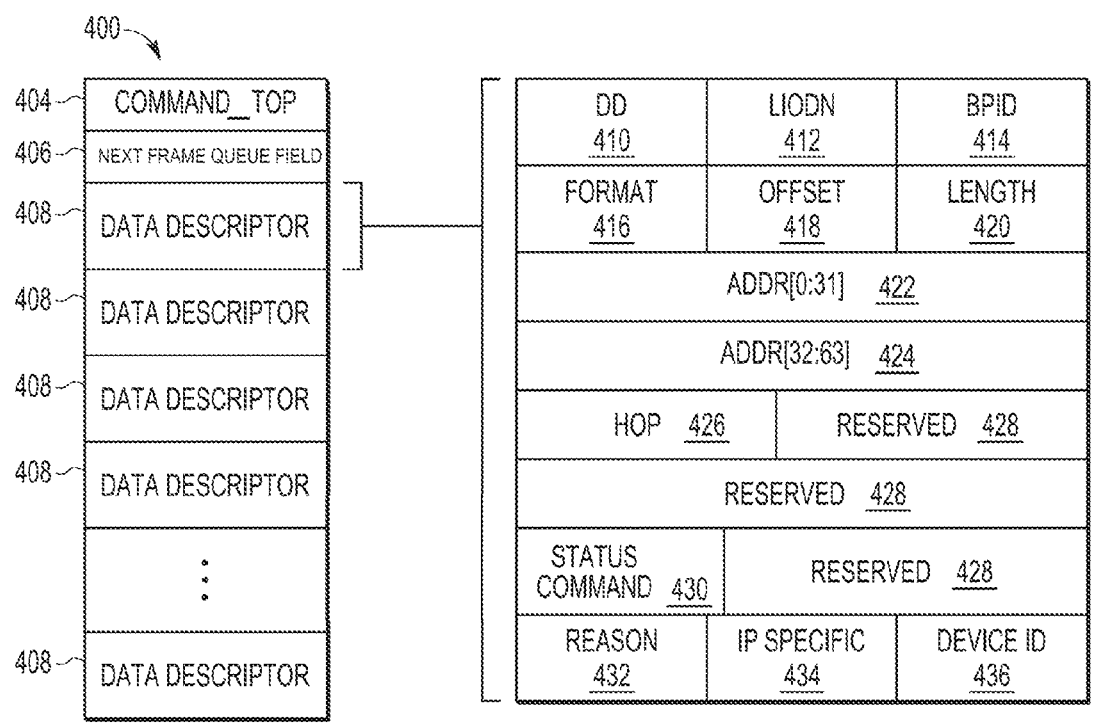
FIG. 4 illustrates an exemplary frame queue and data descriptor within a processor of FIG. 1 in accordance with at least one embodiment of the present disclosure.

FIG. 4 illustrates an exemplary frame queue 400 in accordance with at least one embodiment of the present disclosure. A processor core can store a starting address for a command queue (e.g., command queue 232 of FIG. 2) in a command top field 404 of the frame queue 400. In an embodiment, the command top field 404 can also include a transfer bit that is used to identify whether the data transfer path is normal or autonomous, and can include a last bit to identify which device is the last device in the data path. For simplicity, the transfer bit of the command top field 404 is assumed to be set to indicate that the data transfer path is autonomous. The processor core can also utilize the frame queue 400 to set a data transfer, such as data transfer 202, by storing a pointer to the next frame queue in a next frame queue field, such as next frame queue field 406. The frame queue 400 can store multiple data descriptors 408. Each data descriptor 408 can be created/updated by the data path hardware components (e.g., Ethernet device 118, security device 130, encryption device 132, and message manager 114). A data descriptor 408 is illustrated in detail, and includes a debug field 410, a logic I/O description field 412, a buffer pool identification (ID) field 414, a format field 416, an offset field 418, a length field 420, addresses 422 and 424, a hop field 426, reserved fields 428, a status command field 430, a reason field 432, an IP specific field 434, and a device ID field 436.

The debug field 410 indicates whether the data is used in a debug operation of the processor 102. The logic I/O descriptor 412 can be used for device access control. The buffer pool ID field 414 identifies a pool of buffers assigned by the buffer manager 122 of FIG. 1 to store the received data. The format field 416 includes a direct pointer to an address for a memory location where the data associated with the data descriptor 408 is stored. The offset field 418 includes an offset value to indicate where the data associated with the data descriptor 408 starts within the address. The length field 420 includes the length of the data within the address.

The address fields 422 and 424 identify a location in memory where the component associated with the frame queue 212 can retrieve information about the data. The hop field 430 provides an offset from a starting address of the command queue (e.g., address pointed to by the command top 404) stored in memory 128. The status command field 430 indicates the current status of the data transfer, such as normal, send and redirect, no operation and redirect, or reserved. The reason field 432 includes information identify any transaction errors in the data transfer. The IP specific field 434 may provide additional information associated with why a transfer/operation within a particular data path failed. The device ID field 436 identifies a hardware component, such as the encryption device 132, which detected the error in the data transfer path. Each of the fields within the data descriptor 408 can be updated by the hardware components.

Referring back to the example illustrated in FIG. 3, the processor 102 can receive data via the Ethernet I/O interface 116 of FIG. 1, and the Ethernet device 118 can determine information about the data from a header of the data packet, and can determine a data path for the data within the processor 102 based on the data in the header of the data packet. The Ethernet device 118 can then store the received data packet in the queue 222 using a write operation (illustrated with solid line 310). The Ethernet device 118 can also create a data descriptor 308 in the frame queue (e.g., frame queue 120) associated with the data packet stored in the queue 222. The Ethernet device 118 can also store the data descriptor 308 in the frame queue 212, associated with the security device 130, within the queue manager 120. As shown in FIG. 3, the command top field 304 points to a starting address of the command queue 232 stored in the memory 128.

Figure 5:
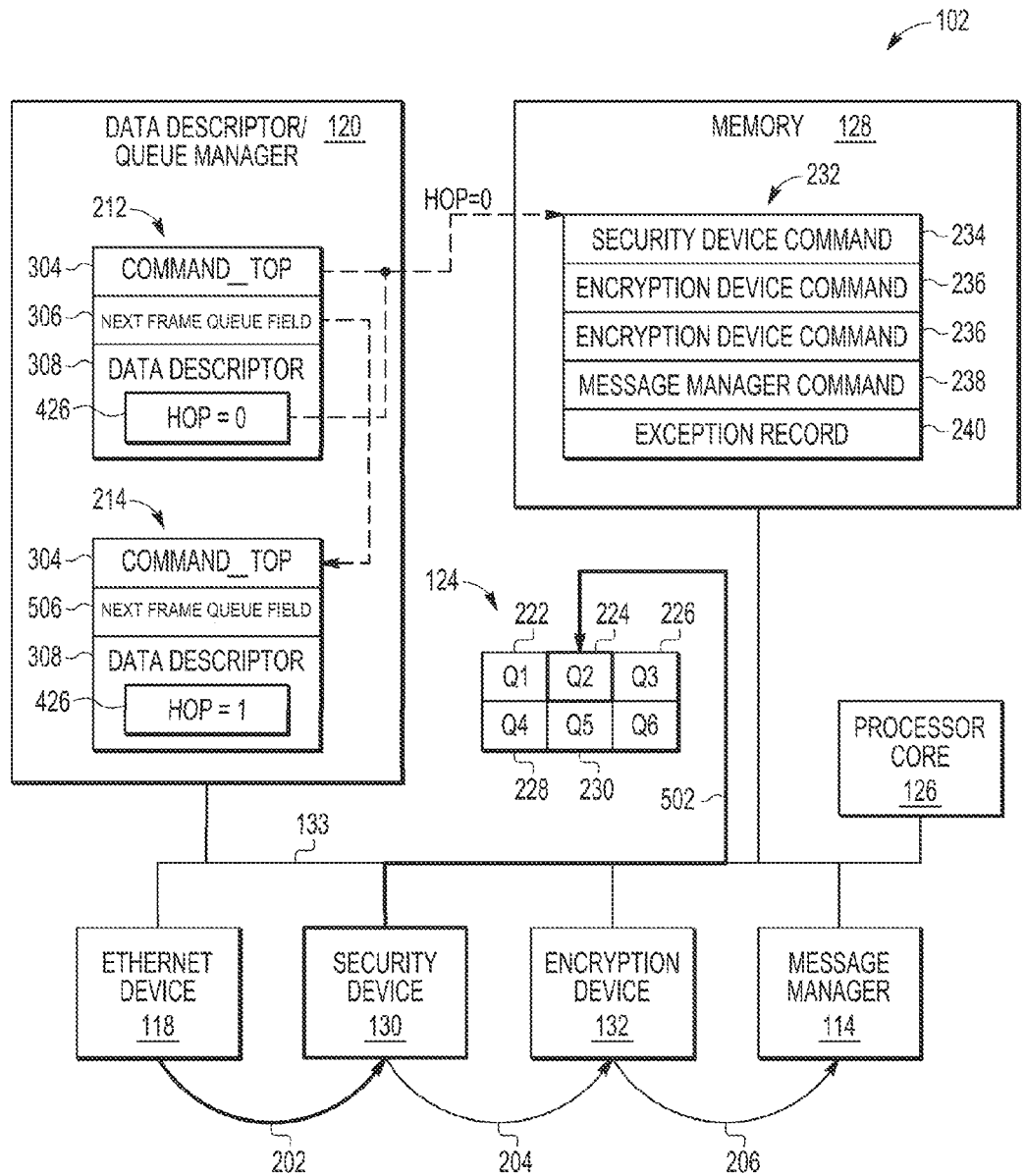
FIGS. 5-10 illustrate the hardware components within the processor of FIG. 1 in more detail in accordance with at least one embodiment of the present disclosure.
Figure 6:
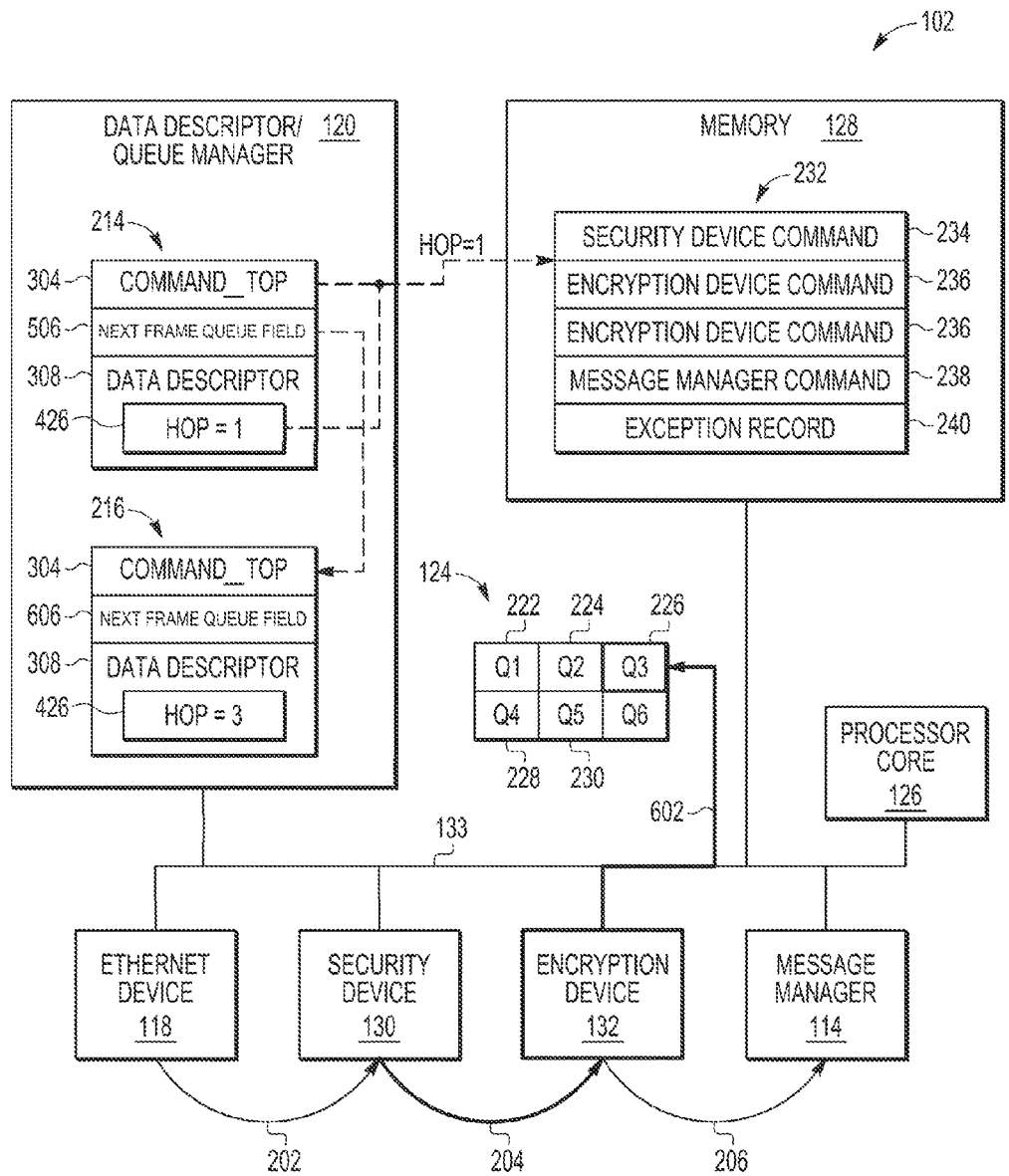
Figure 7:
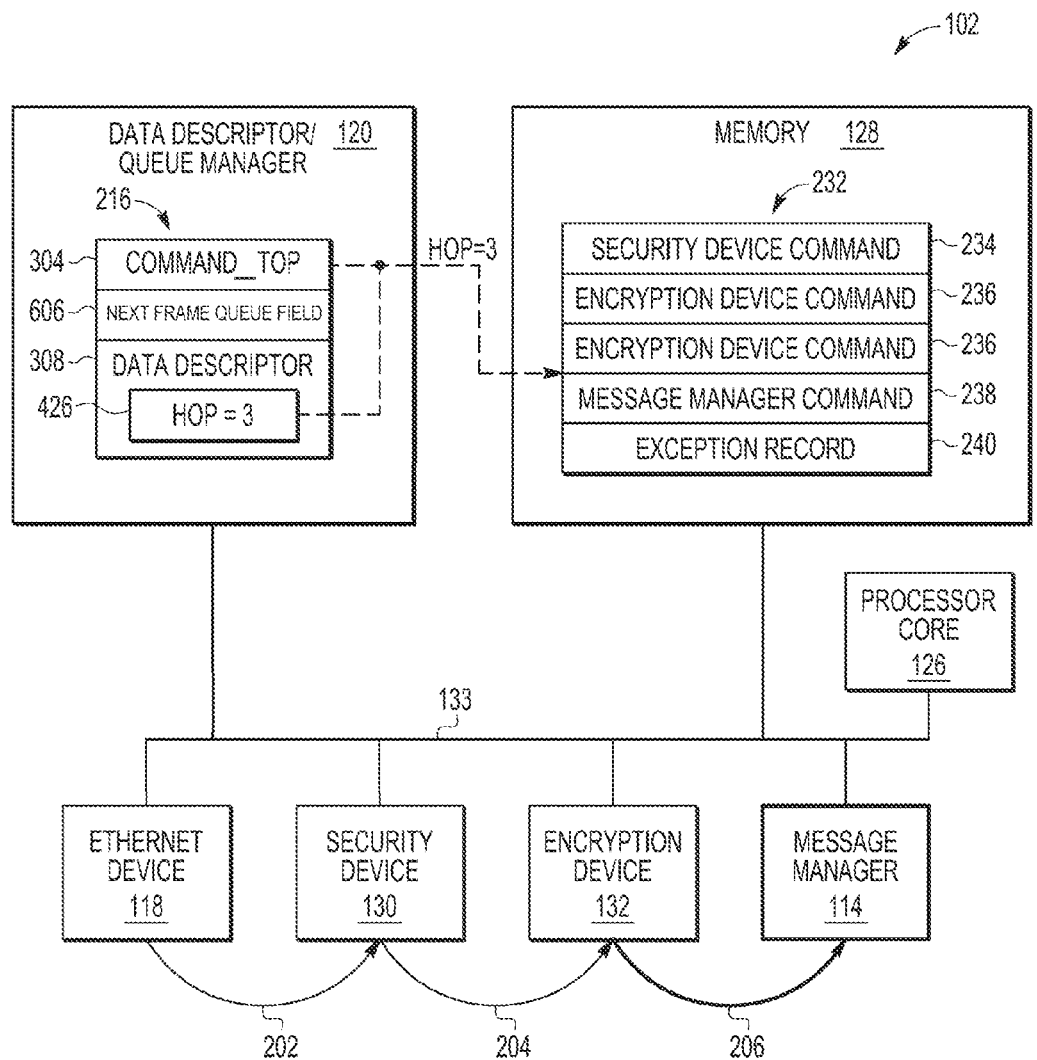

FIGS. 5-7 illustrate actions taken during the data path example illustrated in FIG. 2 that includes data transfers 202, 204, and 206. Referring now to FIG. 5, example data transfer 202 between the Ethernet device 118 and the security device 130 can be initiated via the Ethernet device 118 storing the data descriptor 308 in the frame queue 212. Data descriptor 308 includes all of the fields illustrated in relation to data descriptor 408 of FIG. 4. However, for simplicity only the hop field 426 is illustrated. The security device 130 can monitor the frame queue 212 and upon detecting the data descriptor 308, the security device 130 can retrieve the data descriptor 308, and can retrieve the information from the command top field 304 and the next frame queue field 306. The command top field 304 can be a pointer to the top of the command queue 232 stored in the memory 128. The next frame queue field 306 can indicate a frame queue (e.g., frame queue 214) to store the data descriptor 308 when the security device 130 completes the operation associated with the data in queue 222.

The security device 130 can determine an exact location within the command queue 232 for the security device command 234 by combining the pointer to the top of the command queue 232 stored in the command top field 304 with the value, such as zero, of the hop field 426 in the data descriptor 308. The security device 130 can then execute the security device command 234 with respect to the data from queue 222, and can then write data generated from executing the command into any of the queues 124 (e.g., queue 224), using a write command (illustrated by solid line 502). In an embodiment, each device can write the data to a new queue of the queue 124. The security device 130 can then update the hop field 426 of the data descriptor 308 based on the length of the security device command 234. In an embodiment, each integer increase of the value in the hop field 426 can correspond to an offset of sixteen bytes from the starting address location in the command queue 232. For example, if the security device command 234 is sixteen bytes, the security device 130 can update the value of the hop field 426 from zero to one.

The security device 130 can then use the information in the next frame queue field 306 of the frame queue 212 to determine the frame queue to store the data descriptor 308. For example, the next frame queue field 306 can identify frame queue 214 associated with the encryption device 132 as the next frame queue, such that the data can be transferred to the encryption device 132. The frame queue 214 can also include the command top field 304 and a next frame queue field 506, which can both be utilized by the encryption device 132.

FIG. 6 illustrates actions occurring during data transfer 204, as performed by one embodiment of the present invention. When data descriptor 308 is stored in the frame queue 214, data transfer 204 is initiated and the security device 130 passes the control of the data to the encryption device 132. The encryption device 132 can monitor the frame queue 214, can detect storing of the data descriptor 308 in the frame queue 214, and can retrieve the data descriptor 308 from the frame queue 214. The encryption device 132 can also retrieve the information from the command top field 304 and the next frame queue field 506. The next frame queue field 506 can indicate a frame queue, such as frame queue 216, to store the data descriptor 308 when the encryption device 132 completes the operations associated with the data in queue 224.

The encryption device 132 can determine an exact location within the command queue 232 for the encryption device commands 236 by combining the pointer to the top of the command queue 232 stored in the command top field 304 with the value, such as one, of the hop field 426 in the data descriptor 308. The encryption device 132 can then execute the encryption device commands 236 with respect to the data from queue 224, and can then write data generated from executing the command into any of the queues 124 (e.g., queue 226), using a write command (illustrated by solid line 602). The encryption device 132 can then also update the hop field 426 of the data descriptor 308 based on the length of the encryption device command 236. For example, if the encryption device command 236 is thirty-two bytes, the encryption device 132 can update the value of the hop field 426 from one to three.

The encryption device 132 can then use the information in the next frame queue field 506 of the frame queue 214 to determine the frame queue to store the data descriptor 308. For example, the next frame queue field 506 can identify frame queue 216 associated with the message manager 114 as the next frame queue, such that the data can be transferred to the message manager 114.

FIG. 7 illustrates actions occurring during data transfer 206, as performed by one embodiment of the present invention. When data descriptor 308 is stored in the frame queue 216, data transfer 206 is initiated and the encryption device 132 passes the control of the data to the message manager 114. The message manager 114 can monitor the frame queue 216, can detect storing of the data descriptor 308 in the frame queue 216, and can retrieve the data descriptor 308 from the frame queue 216. The message manager 114 can also retrieve the information from the command top field 304 and the next frame queue field 606. In an embodiment, the next frame queue field 606 can be empty based on the message manager 114 being the destination device of the data transfer path. For example, the message manager 114 can be the destination device based on the message manager 114 sending the data out of the processor 102 via the I/O interface 112 of FIG. 1.

The message manager 114 can determine an exact location within the command queue 232 for the message manager command 238 by combining the pointer to the top of the command queue 232 stored in the command top field 304 with the value, such as three, of the hop field 426 in the data descriptor 308. The message manager 114 can then execute the message manager command 238 with respect to the data from queue 226, such as sending the data out of the processor 102.

In an embodiment, any of the hardware components can update the reason field 432 and the IP specific field 434 in response to detecting an error in the data transfer path. For example, the encryption device 132 can report an error in the reason field 432 and the IP specific field 434 that can get passed down the data transfer path in the data descriptor 308. In an embodiment, only the last device in the data transfer path takes an action in response to the reason field 432 and the IP specific field 434. For example, the message manager 114 can perform a command located in the exception record 248 of the command queue 242. Such a command can be one of: normal operation, send the data and then redirect the data transfer path, perform no operation and redirect the data transfer path, or the like. The last device in the data transfer path can then execute the command, if any, in the exception record 240. In an embodiment the redirection of the data path can be to a processor core 126, which can correct the error.

Figure 8:
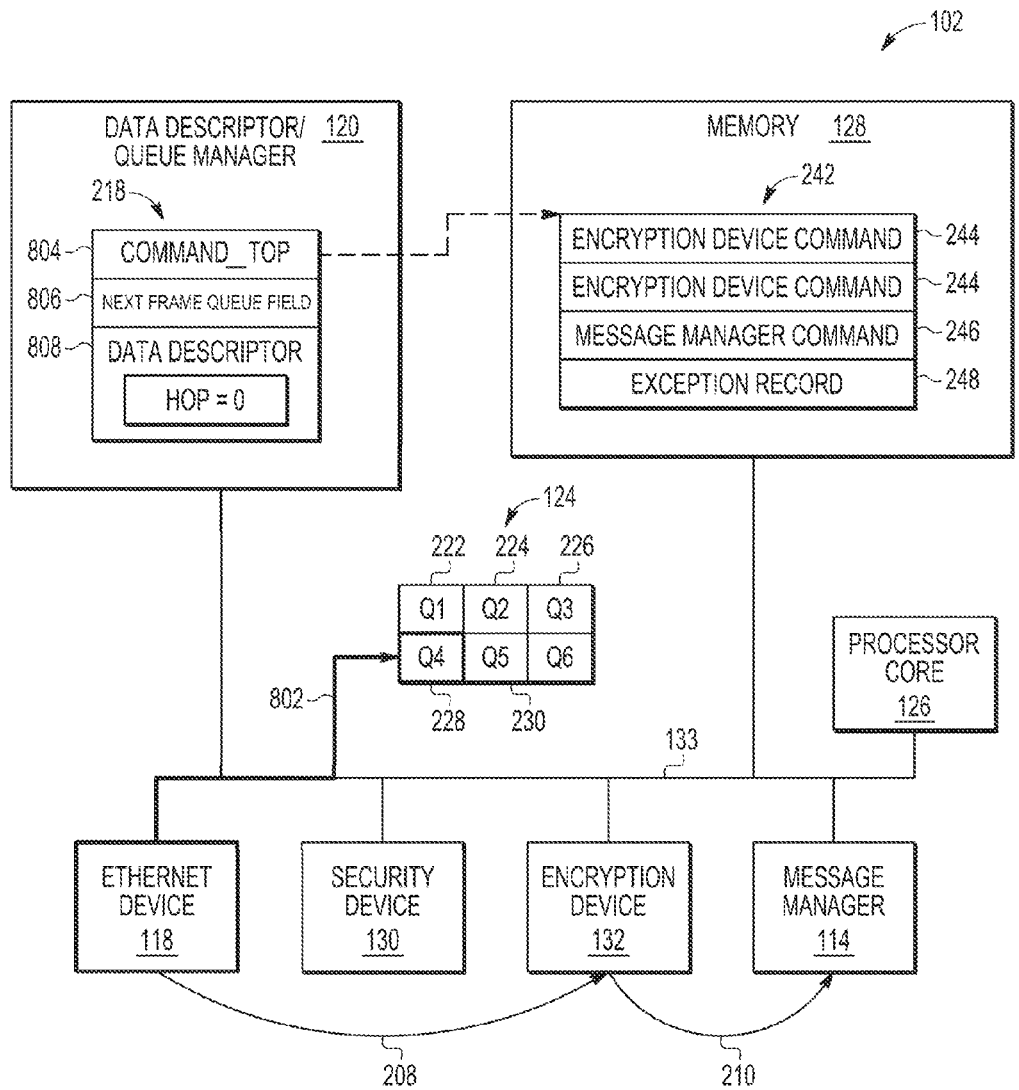
Figure 9:
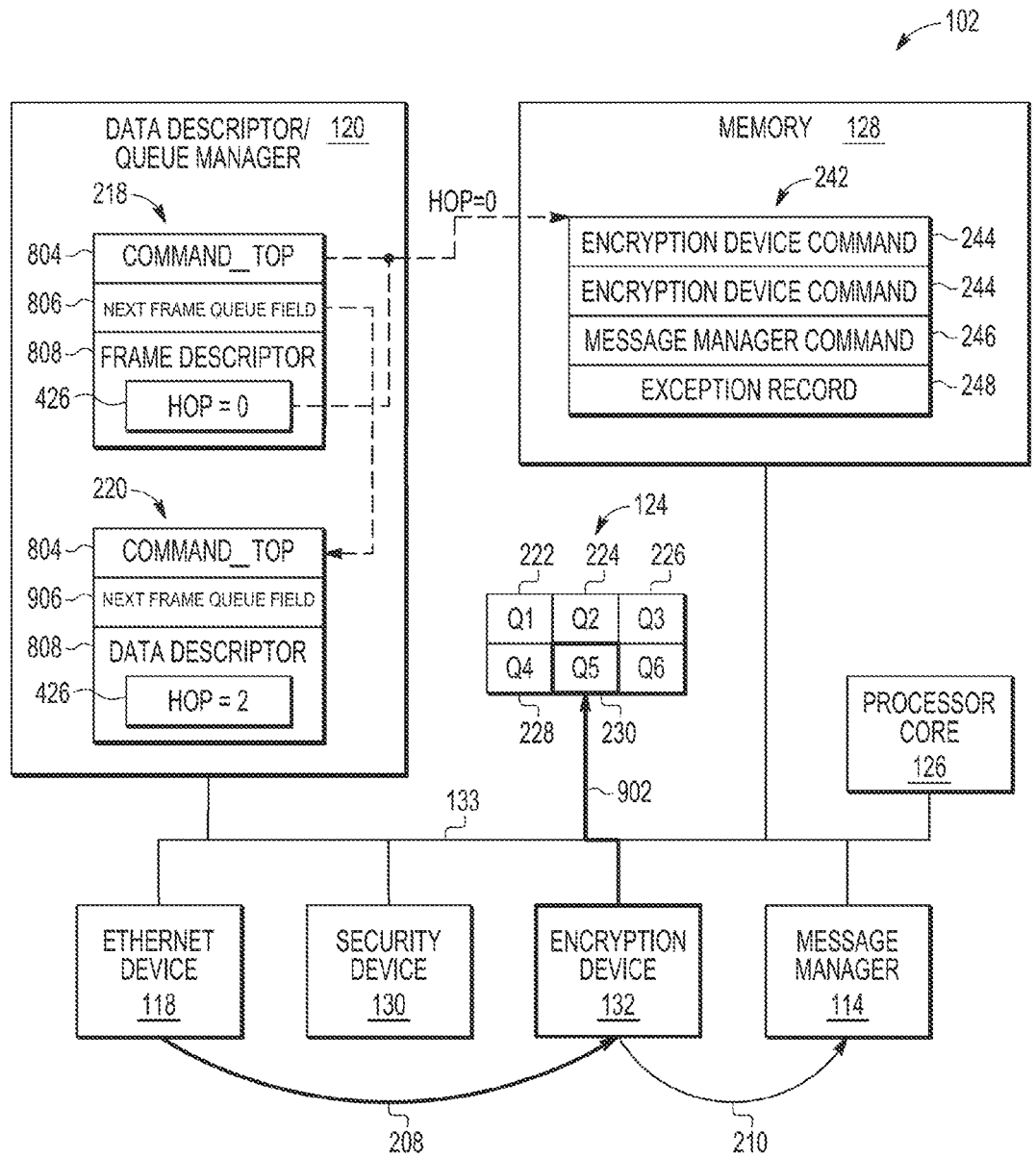
Figure 10:
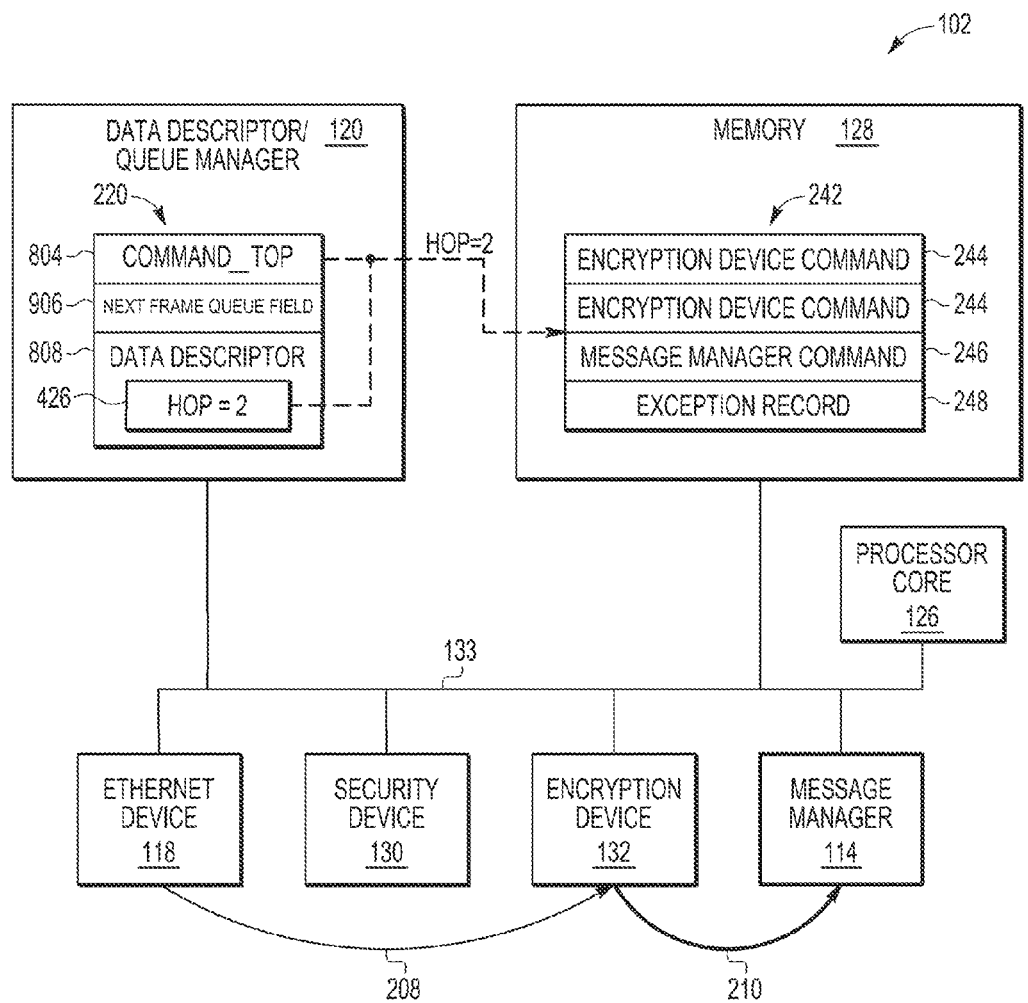

FIGS. 8-10 illustrate actions taken during the data path example illustrated in FIG. 2 that includes data transfers 208 and 210. Each of the frame queues 218 and 220 can include a command top field 804, a next frame queue field (e.g. next frame queue field 806), and a queue to store a number of data descriptors 808. Data descriptor 808 includes all of the fields illustrated in relation to data descriptor 408 of FIG. 4. However, for simplicity only the hop field 426 is illustrated.

As described above, Ethernet device 118 can receive data and determine a data transfer path based on information in a header of a data packet. When the Ethernet device 118 determines the data transfer path including data transfers 208 and 210 is associated with the received data, the Ethernet device 118 can store the data in a queue of the queues 124 (e.g., queue 228). The Ethernet device 118 can store the received data packet in the queue 228 using a write operation (illustrated by solid line 802). The Ethernet device 118 can also create a data descriptor 808 associated with the data packet stored in the queue 228. The Ethernet device 118 can store the data descriptor 808 in the frame queue 218 within the queue manager 120.

FIG. 9 illustrates actions occurring during data transfer 208, as performed by one embodiment of the present invention. When data descriptor 808 is stored in the frame queue 218, data transfer 208 is initiated and the Ethernet device 118 passes the control of the data to the encryption device 132. The encryption device 132 can monitor the frame queue 218, can detect the data descriptor 308 in the frame queue 218, and can retrieve the data descriptor 808 from the frame queue 218. The encryption device 130 can also retrieve the information from the command top field 804 and the next frame queue field 806. The next frame queue field 806 can identify a frame queue (e.g., frame queue 220) to store the data descriptor 808 when the encryption device 132 completes the operation associated with the data in queue 228.

The encryption device 132 can determine an exact location within the command queue 242 for the encryption device command 244 by combining the pointer to the top of the command queue 232 stored in the command top field 804 with the value, such as zero, of the hop field 426 in the data descriptor 308. The encryption device 132 can then execute the encryption device command 244 with respect to the data from queue 228, and can then write data into any of the queues 124 (e.g., queue 230) using a write command (illustrated by solid line 902). The encryption device 132 can then update the hop field 426 of the data descriptor 808 based on the length of the encryption device command 244. For example, if the encryption device command 244 is thirty-two bytes, the encryption device 132 can update the value of the hop field 426 from zero to two.

The encryption device 132 can then use the information in the next frame queue field 806 of the frame queue 218 to determine the frame queue to store the data descriptor 808. For example, the next frame queue field 806 can identify frame queue 220 associated with the message manager 114 as the next frame queue, such that the data can be transferred to the message manager 114.

FIG. 10 illustrates actions occurring during data transfer 210, as performed by one embodiment of the present invention. When the data descriptor 808 is stored in the frame queue 220, data transfer 210 is initiated and the encryption device 132 passes the control of the data to the message manager 114. The message manager 114 can monitor the frame queue 220, can detect storing of the data descriptor 808 in the frame queue 220, and can retrieve the data descriptor 808 from the frame queue 220. The message manager 114 can also retrieve the information from the command top field 804 and the next frame queue field 906. In an embodiment, the next frame queue field 906 can be empty based on the message manager 114 being the destination device of the data transfer path.

The message manager 114 can determine an exact location within the command queue 242 for the message manager command 246 by combining the pointer to the top of the command queue 232 stored in the command top field 804 with the value, such as two, of the hop field 426 in the data descriptor 808. The message manager 114 can then execute the message manager command 246 with respect to the data from queue 230, such as sending the data out of the processor 102.

In accordance with one aspect of the present disclosure, a method is disclosed. The method includes determining, by a processor core, a sequence of a first plurality of devices as a first data transfer path. The method also includes storing a plurality of commands in a first command queue to be executed by the first plurality of devices during a traverse of the first data transfer path. The method further includes assigning, by the processor core, a frame queue to each corresponding device of the first plurality of devices. In this case, each frame queue includes a first field identifying an address of the first command queue, and a second field identifying a frame queue location corresponding to a next-in-sequence device of the first data path.

In one embodiment, the method includes defining, by the processor core, a sequence of a second plurality of devices as a second data transfer path. The method also includes storing a plurality of commands in a second command queue to be executed by the second plurality of devices during a traverse of the second data transfer path. The method further includes assigning, by the processor core, a frame queue for each of the second plurality of devices. In this case, each frame queue for each of the second plurality of devices includes a first field identifying an address of the second command queue, and a second field identifying a frame queue location corresponding to a next-in-sequence device of the second data path.

In one embodiment, the method includes storing, in a memory coupled to each of the first plurality of devices and the processor core, a data descriptor in a first-in-sequence frame queue of the first data path to initiate a data transfer along the first data transfer path. In this case, the data descriptor comprises a field providing an offset value from the address of the first command queue to a location of a first-in-sequence command for a device of the first plurality of devices corresponding to the first-in-sequence frame queue.

In one embodiment, the method includes executing one or more commands in the first command queue by a device of the first plurality of devices. The method also includes updating the offset value in the second field of the data descriptor in response to executing the command. The method further includes storing the data descriptor having the updated offset value in a next-in-sequence frame queue.

In one embodiment, updating the offset value is based on a number of bytes corresponding to a length of the one or more commands. In a further embodiment, the plurality of commands comprises: a first one or more commands for a first device of the first plurality of devices, and a second one or more commands for a second device of the first plurality of devices.

In another embodiment, the plurality of commands comprises: a first command set for a first device of the first plurality of devices; and a second command set for a second device of the first plurality of devices. In a further embodiment, the first command set and the second command set comprise commands having different lengths. In one embodiment, a next-in-sequence frame queue identified in the second field is different for each of the frame queues of each of the first plurality of devices. In another embodiment, a next-in-sequence frame queue identified in the second field is the same for two frame queues of the first plurality of devices.

In accordance with one aspect of the present disclosure, a method is disclosed. The method includes storing, by a processor core, a plurality of commands for a first plurality of devices of a first data transfer path. In this case, the plurality of commands is stored in a first command queue, and the plurality of commands comprises at least one command for a first device and at least one command for a second device. The method also includes associating a frame queue for each of the first plurality of devices. In this case, each frame queue comprises a first field having a pointer to a start address of the first command queue, and a second field identifying the frame queue corresponding to a next-in-sequence device of the first data transfer path. The method further includes storing, in a memory coupled to the first device, the second device, and the processor core, a data descriptor in the frame queue of the second device to transfer data from the first device to the second device. In this case the data descriptor comprises a field providing an offset value from the start address of the first command queue to a location of a command to be executed by the second device.

In one embodiment, the method includes storing a plurality of commands in a second command queue to be executed by a second plurality of devices during a traverse of a second data transfer path. The method also includes associating a frame queue for each of the second plurality of devices. In this case, each frame queue includes a first field having a pointer to a start address of the second command queue, and a second field identifying a frame queue corresponding to a next-in-sequence device of the second data transfer path.

In one embodiment, the method includes executing one or more commands in the first command queue by the first device of the first plurality of devices. The method also includes updating the offset value in the second field of the data descriptor in response to executing the command. The method further includes storing the data descriptor having the updated offset value in a next-in-sequence frame queue.

In a further embodiment, updating the offset value is based on a number of bytes corresponding to a length of the one or more commands. In one embodiment, a next-in-sequence frame queue identified in the second field is different for each of the frame queues of each of the first plurality of devices.

In accordance with one aspect of the present disclosure, a data processing device is disclosed. The data processing device includes a plurality of devices each configured to execute one or more commands during a traverse of a data transfer path. In this case, the data transfer path comprises the plurality of devices. The data processing device also includes a processor core, coupled to the plurality of devices, and configured to define the plurality of devices as the data transfer path of the data processing device, and to define the one or more commands to be executed by each of the plurality of devices. In this case, the one or more commands comprise at least one command for a first device of the plurality of devices and at least one command for a second device of the plurality of devices. The data processing device further includes a memory, communicatively coupled to the processor core and each of the plurality of devices, and configured to store the one or more commands in a command queue. The data processing device also includes a queue manager, communicatively coupled to the processor core and each of the plurality of devices, and configured to store a frame queue for each of the plurality of devices of the data transfer path. In this case, each frame queue comprises a first field having a pointer to an address of the command queue and a second field to identify a next-in-sequence frame queue. Also, the first device of the plurality of devices is configured to store a data descriptor in the frame queue of the second device to initiate a data transfer from the first device to the second device of the plurality of devices. Further, the data descriptor includes a field to indicate an offset value from the address of the command queue to a location of a command to be executed by the second device.

In one embodiment, the processor core is further configured to set the data transfer path for a first data type. In another embodiment, the processor core is further configured to set a second data transfer path for a second data type. In one embodiment, the first device of the plurality of devices is configured to: execute one or more commands in the command queue and in response update the offset value in the second field of the data descriptor; and store the data descriptor having the updated offset value in a next-in-sequence frame queue.

In a further embodiment, a last device of the plurality of devices along the data transfer path is configured to: execute a last command of the one or more commands in response to the data descriptor in a frame queue associated with the last device indicating that an error was detected in the data transfer path.

The concepts of the present disclosure have been described above with reference to specific embodiments. However, one of ordinary skill in the art will appreciate that various modifications and changes can be made without departing from the scope of the present disclosure as set forth in the claims below. In particular, the selective assignment of DMA transfer requests based on the source addresses of the pending transfer requests can be applied to any type of memory that can receive and internally re-order access requests, not just DDR memory. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:

1. A method comprising:
   determining, by a processor core, a sequence of a first plurality of devices as a first data transfer path;
   storing a plurality of commands in a first command queue to be executed by the first plurality of devices during a traverse of the first data transfer path; and
   assigning, by the processor core, a frame queue to each corresponding device of the first plurality of devices, wherein each frame queue includes a first field identifying an address of the first command queue, and a second field identifying a frame queue location corresponding to a next-in-sequence device of the first data transfer path.

2. The method of claim 1, further comprising:
   defining, by the processor core, a sequence of a second plurality of devices as a second data transfer path;
   storing a plurality of commands in a second command queue to be executed by the second plurality of devices during a traverse of the second data transfer path; and
   assigning, by the processor core, a frame queue for each of the second plurality of devices, wherein the each frame queue for each of the second plurality of devices includes a first field identifying an address of the second command queue, and a second field identifying a frame queue location corresponding to a next-in-sequence device of the second data path.

3. The method of claim 1, further comprising:
   storing, in a memory coupled to each of the first plurality of devices and the processor core, a data descriptor in a first-in-sequence frame queue of the first data path to initiate a data transfer along the first data transfer path, wherein the data descriptor comprises a field providing an offset value from the address of the first command queue to a location of a first-in-sequence command for a device of the first plurality of devices corresponding to the first-in-sequence frame queue.

4. The method of claim 3, further comprising:
   executing one or more commands in the first command queue by a device of the first plurality of devices;
   updating the offset value in the second field of the data descriptor in response to executing the command; and
   storing the data descriptor having the updated offset value in a next-in-sequence frame queue.

5. The method of claim 4, wherein updating the offset value is based on a number of bytes corresponding to a length of the one or more commands.

6. The method of claim 1, wherein the plurality of commands comprises: a first one or more commands for a first device of the first plurality of devices, and a second one or more commands for a second device of the first plurality of devices.

7. The method of claim 1, wherein the plurality of commands comprises: a first command set for a first device of the first plurality of devices; and a second command set for a second device of the first plurality of devices.

8. The method of claim 7, wherein the first command set and the second command set comprise commands having different lengths.

9. The method of claim 1, wherein a next-in-sequence frame queue identified in the second field is different for each of the frame queues of each of the first plurality of devices.

10. The method of claim 1, wherein a next-in-sequence frame queue identified in the second field is the same for two frame queues of the first plurality of devices.

11. A method comprising:
storing, by a processor core, a plurality of commands for a first plurality of devices of a first data transfer path, wherein the plurality of commands are stored in a first command queue, and the plurality of commands comprise at least one command for a first device and at least one command for a second device;
associating a frame queue for each of the first plurality of devices, wherein each frame queue comprises a first field having a pointer to a start address of the first command queue, and a second field identifying the frame queue corresponding to a next-in-sequence device of the first data transfer path; and
storing, in a memory coupled to the first device, the second device, and the processor core, a data descriptor in the frame queue of the second device to transfer data from the first device to the second device, wherein the data descriptor comprises a field providing an offset value from the start address of the first command queue to a location of a command to be executed by the second device.

12. The method of claim 11, further comprising:
storing a plurality of commands in a second command queue to be executed by a second plurality of devices during a traverse of a second data transfer path; and
associating a frame queue for each of the second plurality of devices, wherein each frame queue includes a first field having a pointer to a start address of the second command queue, and a second field identifying a frame queue corresponding to a next-in-sequence device of the second data transfer path.

13. The method of claim 11, further comprising:
executing one or more commands in the first command queue by the first device of the first plurality of devices;
updating the offset value in the second field of the data descriptor in response to executing the command; and
storing the data descriptor having the updated offset value in a next-in-sequence frame queue.

14. The method of claim 13, wherein updating the offset value is based on a number of bytes corresponding to a length of the one or more commands.

15. The method of claim 11, wherein a next-in-sequence frame queue identified in the second field is different for each of the frame queues of each of the first plurality of devices.

16. A data processing device comprising:
a plurality of devices each configured to execute one or more commands during a traverse of a data transfer path, wherein the data transfer path comprises the plurality of devices;
a processor core, coupled to the plurality of devices, and configured to define the plurality of devices as the data transfer path of the data processing device, and to define the one or more commands to be executed by each of the plurality of devices, wherein the one or more commands comprise at least one command for a first device of the plurality of devices and at least one command for a second device of the plurality of devices;
a memory, communicatively coupled to the processor core and each of the plurality of devices, and configured to store the one or more commands in a command queue; and
a queue manager, communicatively coupled to the processor core and each of the plurality of devices, and configured to store a frame queue for each of the plurality of devices of the data transfer path, wherein
each frame queue comprises a first field having a pointer to an address of the command queue and a second field to identify a next-in-sequence frame queue,
the first device of the plurality of devices is configured to store a data descriptor in the frame queue of the second device to initiate a data transfer from the first device to the second device of the plurality of devices, and
the data descriptor includes a field to indicate an offset value from the address of the command queue to a location of a command to be executed by the second device.

17. The data processor device of claim 16, wherein the processor core is further configured to set the data transfer path for a first data type.

18. The data processor device of claim 17, wherein the processor core is further configured to set a second data transfer path for a second data type.

19. The data processor device of claim 16, wherein the first device of the plurality of devices is configured to:
execute one or more commands in the command queue and in response update the offset value in the second field of the data descriptor; and
store the data descriptor having the updated offset value in a next-in-sequence frame queue.

20. The data processor device of claim 19, wherein a last device of the plurality of devices along the data transfer path is configured to:
execute a last command of the one or more commands in response to the data descriptor in a frame queue associated with the last device indicating that an error was detected in the data transfer path.

* * * * *